Jan. 5, 1932.  G. O. WILMS  1,839,938
ELECTRICAL CONTROL APPARATUS
Filed March 17, 1927    2 Sheets-Sheet 1

Inventor:
Gustav O. Wilms
By Ira Milton Jones
Attorney

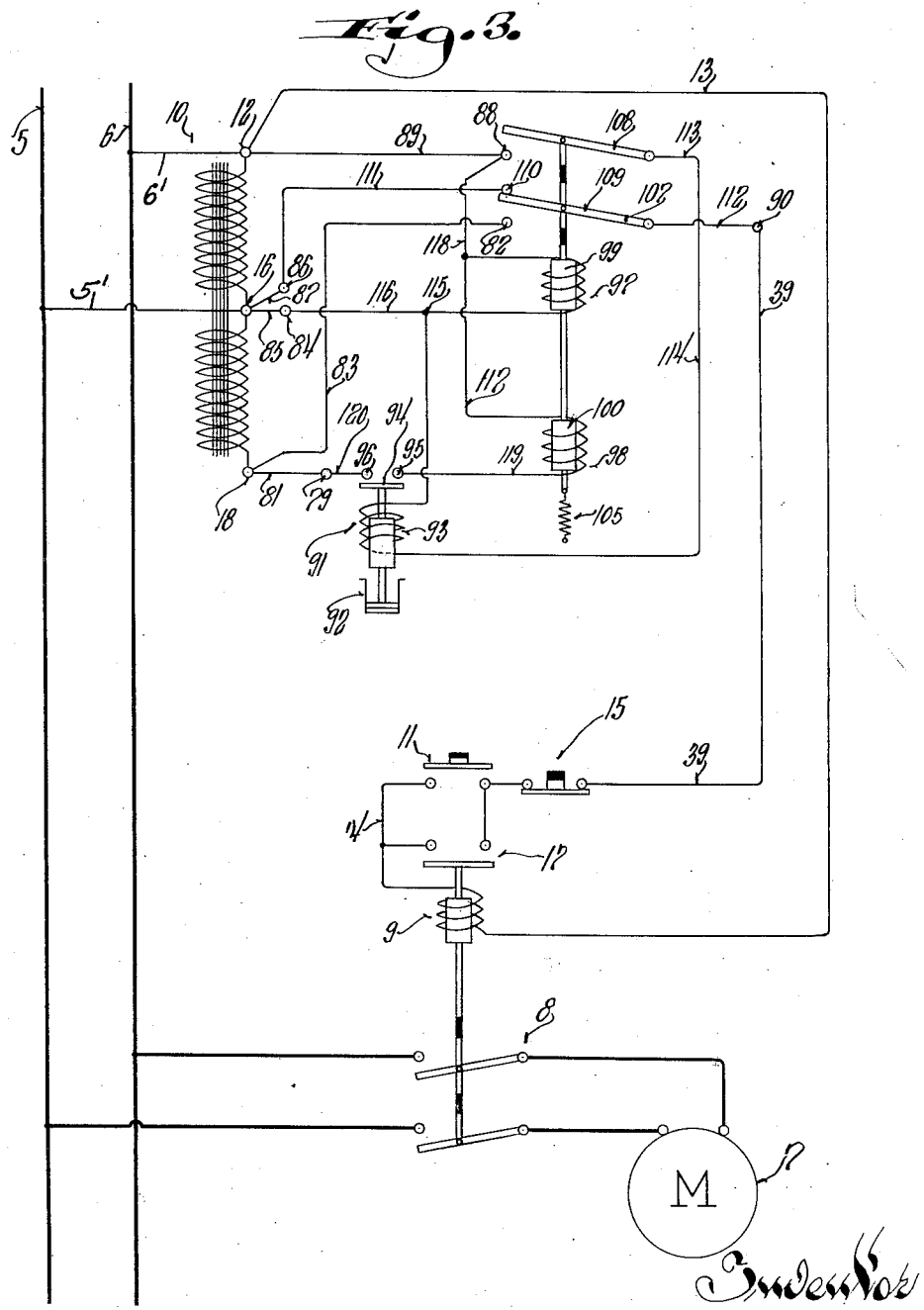

Patented Jan. 5, 1932

1,839,938

UNITED STATES PATENT OFFICE

GUSTAV O. WILMS, OF MILWAUKEE, WISCONSIN, ASSIGNOR, BY MESNE ASSIGNMENTS, TO ALLEN-BRADLEY COMPANY, OF MILWAUKEE, WISCONSIN, A CORPORATION OF WISCONSIN

ELECTRICAL CONTROL APPARATUS

Application filed March 17, 1927. Serial No. 176,251.

This invention relates to certain new and useful improvements in electrical control apparatus and refers more particularly to devices of the character especially designed for use with motor starting equipment.

Considerable difficulty has been experienced in keeping control equipment in upon sudden voltage dips caused either by line disturbances or switch-overs to clear lines. While these voltage dips are of very short duration—about one to two-tenths of a second—the voltage may momentarily fall as low as thirty per cent of full voltage, or may even reach zero for an instant. Even though the period of voltage drop is extremely brief, it is sufficient to permit release of the magnet on hand starters and in the case of automatic starting equipment to permit opening of the magnetic switch, thus stopping the motor or motors controlled thereby. Where the motors drive no essential loads, this is not a serious matter, but where the loads are essential—as found in paper mills, steel rolling mills, steel treating plants, ice machine plants, etc.,—such shut-downs have serious results. For hand operated equipment, this difficulty can be overcome by incorporating a time delay method in connection with the low voltage release load which will delay the opening action long enough to prevent dropping open of the starter during the period of voltage drop, but with the automatic control, this is more difficult to accomplish, since the adjustment of a delaying mechanism on each magnetic switch would be expensive and may be a source of considerable trouble.

It is, therefore, a primary object of this invention to provide an improved electrical control apparatus which is especially adaptable for use with motor starting and other electrical equipment which will have simple and efficient means incorporated therein to prevent the interruption of the motor circuit upon a momentary drop in the line voltage whereby the serious results heretofore occasioned by the stopping of the motors due to the control interrupting the motor circuit upon the momentary drop in the line voltage is prevented.

It is another object of this invention to provide an improved electrical control apparatus adapted for use with motor starting equipment which utilizes the delay or lag in the opening of a motor switch caused by the counter E. M. F. of the motor to provide the necessary time in which to connect the circuit of the hold-in magnet coil of the switch control with a source of greater voltage to thus prevent the opening of the switch and the consequent stopping of the motor.

This invention contemplates as a further object the provision of novel and improved means for preventing the release of the hold-in magnet of motor starting or other electrical equipment upon a momentary drop in the line voltage which may be applied to all types and makes of equipment and which involves no change in the construction thereof or in the circuit other than to insert my improved device in one side of the hold-in magnet circuit.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, in which:

Figure 3 is a diagrammatic view of the wiring circuits of a conventional motor starting control with my improved apparatus applied thereto.

Referring now more particularly to the accompanying drawings and more especially to Figure 3, numerals 5 and 6 designate service lines leading from a source of energy and 7 the motor or other electrical equipment adapted to derive its motive power from the service lines with which it is connected by the closing of a switch 8 upon the energization of its solenoid 9.

Figure 1:
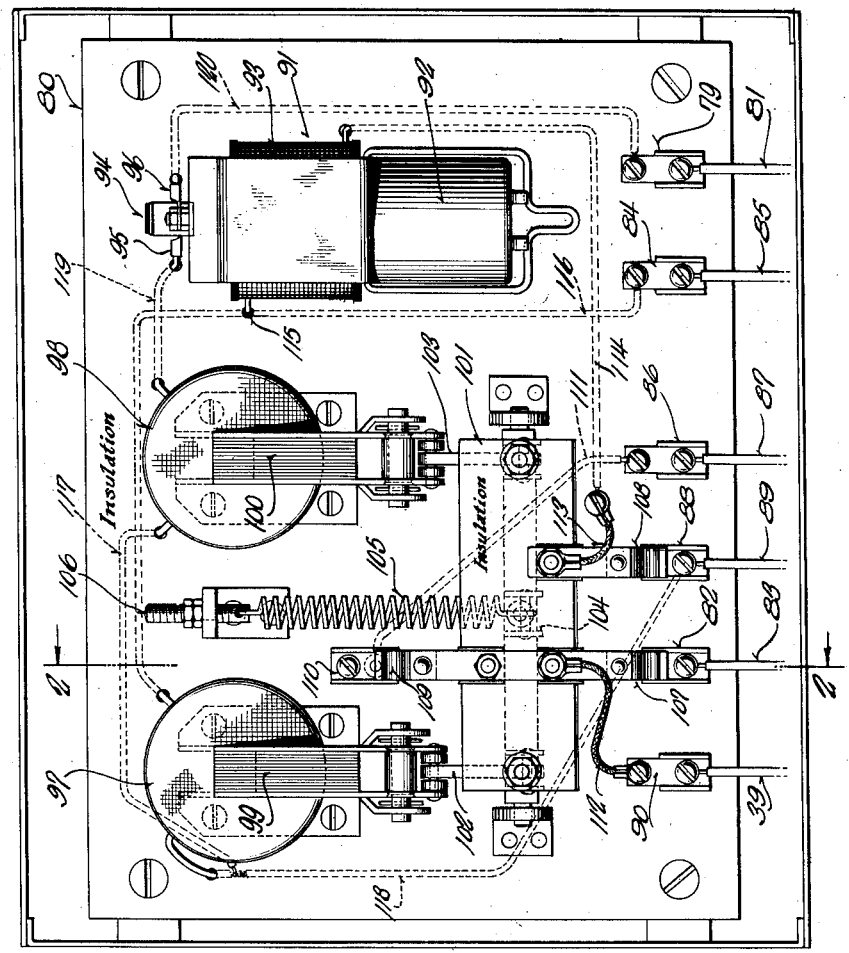
Figure 1 is a plan view of my improved apparatus.
Figure 2:
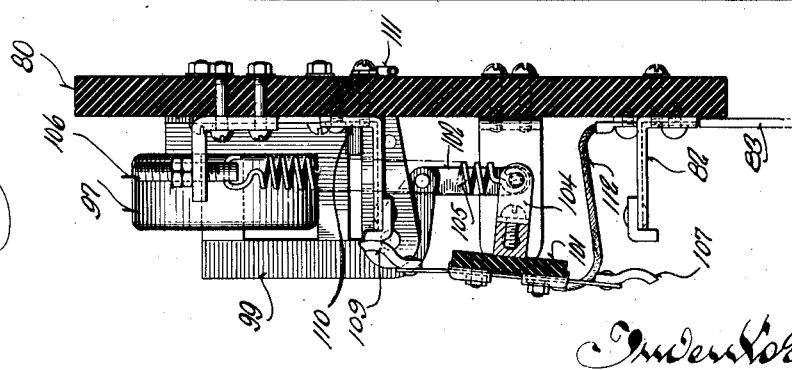
Figure 2 is a transverse view, partly in section and partly in elevation, taken through Figure 1 in the plane of the line 2—2.

The solenoid 9 is adapted to be connected across the line by closing a normally open "start" push button switch 11. The circuit connecting the solenoid across the line extends from one terminal 12 of an auto transformer 10, which terminal is directly connected with the line 6 through a lead 61, through a conductor 13 to one side of the solenoid, through the solenoid and a conductor 14, to one side of the switch 11, through the switch and to one side of a normally closed "stop" push button switch 15. From the other side of the "stop" switch 15 a conductor 39 leads to a tap 16 on the auto transformer through the control apparatus illustrated in Figures 1 and 2, the tap 16 being directly connected with the line 5 by a lead 5'.

As the solenoid 9 is energized it attracts its armature which closes the switch 8 and likewise closes a switch 17, which, being in parallel with the starting switch 11 maintains the circuit of the solenoid 9 closed after the switch 11 is released and until it is interrupted by actuation of the "stop" switch 15.

In the above described starting device a momentary dip in voltage on the main line will lower the voltage supplied to the solenoid 9 to a point where it releases its armature permitting the switch 8 to open and stop the motor. It is to prevent this stopping of the motor upon dips in the line voltage that the device forming the subject matter of this application is designed to offset, by providing means for supplying the deficiency in voltage automatically upon the dip in the voltage so that the magnetism of the solenoid 9 at all times remains substantially constant, or at least sufficient to maintain the switch 8 closed. This is accomplished by interposing the control mechanism illustrated in Figures 1 and 2 within the conductor 39 whereby the momentary dips in line voltage are utilized to actuate the mechanism to impose added voltage on the solenoid 9 to thus prevent the interruption of the motor circuit and attendant inconveniences.

The transformer 10 has its high voltage tap 18 connected with a terminal 79 fixed on a mounting panel 80, by a conductor 81 and with a contact 82 by a conductor 83. The tap 16 of the transformer from which the normal operating current is taken, is connected with a terminal 84 by a conductor 85, and with a terminal 86 by a conductor 87. The other end 12 of the transformer is connected with a stationary contact 88 by a conductor 89 and the conductor 39 instead of being connected directly with the tap 16 of the transformer is connected with a terminal 90.

Mounted upon the panel 80 is a delay device 91 having a suitable delay mechanism designated generally, as at 92, a winding 93 and a movable contactor 94 influenced thereby to bridge contacts 95 and 96. Also mounted on the panel is a pair of magnets 97 and 98 arranged to attract armatures 99 and 100, respectively, the armatures being connected with a pivoted contact carrying panel 101 through link connections 102 and 103, whereby movement of the armatures affects a corresponding tilting movement of the panel 101. The panel 101 has a lever 104 projecting therefrom with which one end of a contractile spring 105 is connected, the spring having its other end connected with an adjustable tensioning device 106 so that it normally tends to tilt the panel 101 to move the armatures 99 and 100 from their respective magnet coils and engage movable contactors 107 and 108 carried by the panel 101 with the stationary contacts 82 and 88, respectively, and to likewise disengage a contactor 109 carried by the panel 101 from a stationary contact 110 mounted on the panel and connected with the terminal 86 by a conductor 111.

The movable contactors 107 and 109 are electrically connected with each other and with the conductor 39 by a flexible lead 112 extended therefrom to the terminal 90 and the movable contactor 108 is connected with one side of the delay device winding 93 through a flexible lead 113 and a conductor 114. The other side of the winding 93 is connected, as at 115, with a conductor 116 extending from the terminal 84 to one side of the magnet coil 97, and the other side of the magnet coil 97 is common to one side of the coil 98 through a conductor 117 and is electrically connected with the stationary contact 88 through a conductor 118. The other side of the magnet coil 98 is connected with the contact 95 of the delay device through a conductor 119 and the contact 96 thereof is connected with the terminal 79 through a conductor 120.

The description so far has been limited to the mechanical elements of the control and the operation thereof will now be more fully described.

It is a well known fact that where a switch controls a motor circuit, the counter E. M. F. of the motor causes the switch to drop out comparatively slowly. In average instances where the current supply operates at 60 cycles it has been found that switches stay closed for five to six cycles. This lag or delay in opening is made use of in the present application to provide the necessary time in which the mechanism functions to connect the circuit of the hold-in solenoid 9 with the higher voltage to prevent its deenergization to a point where it allows the switch 8 to open.

Considering the entire apparatus to be in normal working condition, i. e., the motor switch 8 being held closed by the solenoid 9 which is connected with the lines on one side through the conductor 13 leading to the terminal or tap 12 and on the other side through the conductor 39, which, however, does not lead directly to the tap 16, but instead terminates at the terminal 90. From the terminal 90 the circuit is completed through flexible lead 112, contact 109 to contact 110, through conductor 111 to terminal 86 and to the tap 16 through conductor 87. It will be seen that the contactor 109 is in engagement with the contact 110, being held there against the action of the spring 105 by the attraction of the magnet coil 97 to its armature 99, acting through the link members 102 and 103 in the manner previously described. The coil 97 is so designed that it will release its armature at approximately 80 per cent of full voltage so that any dip in the line voltage which would be great enough to release the armature of the solenoid 9 will permit the spring 105 to snap the pivoted contact carrying panel 101 to its other position thereby disengaging the contactor 109 from the contact 110 and engaging the contactors 107 and 108 with contacts 82 and 88, respectively. It will also be seen that the coil 97 is at all times energized, being connected across the line by the through conductors 118 and 89 on one side and conductors 116 and 85 on the other side.

In the event that the voltage in the main line suddenly dips, the magnet coil 97 releases its armature 99 within one to two cycles, thus allowing the spring 105 to snap the contact carrying panel 101 to its other position, before the drop in voltage can affect the hold-in solenoid 9 which maintains its magnetism during this short duration due to the counter E. M. F. of the motor. Releasing of the magnet coil 97 connects the circuit of the solenoid 9 with the higher voltage of the transformer by the engagement of the contactor 107 with the stationary contact 82, the circuit being completed through conductor 13 on one side of the coil and on the other side, from the high voltage side of the transformer through conductor 83 to terminal 82, contactor 107, through flexible lead 112 to terminal 90 and then through conductor 39 to the solenoid 9, thereby preventing the release of its armature during the duration of the voltage dip.

Simultaneously with the engagement of the contactor 107 with its contact 82 the contactor 108 engages its contact 88 to close the circuit for the coil 93 of the delay device 91 energizing it and causing its contactor 94 to begin its closing movement. This circuit may be traced from the tap 12 on the transformer through the conductor 89 to contact 88, contactor 108, flexible lead 114, conductor 114 to one side of the coil 93, through the coil to point 115, conductor 116 to terminal 84 and conductor 85 to tap 16 of the transformer.

The delay device 91 controls the duration of time in which the motor switch control is connected with the high voltage out-put of the transformer and its setting is such that full voltage is again reestablished on the main line before it functions to connect the switch control with its normal voltage. After the predetermined time interval at which the device is set the contactor 94 engages its fixed contacts 95 and 96 bridging the same to close the circuit for the magnet coil 98. This coil 98 is provided solely for the purpose of assisting the coil 97 in pulling back the contact carrying panel 101 to its normal position, against the action of the spring 105 and the current therefor passes from the tap 12 of the transformer through conductor 89 to terminal 88, conductors 118 and 117 to one side of the coil 98, through the coil, conductor 119 to contact 95 across the contact 96 through contactor 94, through conductor 120 to terminal 79 and through conductor 81 to the high voltage side 18 of the transformer. When this circuit is completed and energization of the coil 98 effected, it immediately assists the coil 97 and together they attract their armatures 100 and 99, respectively, thereby pulling back the contact carrying panel 101 to its normal position. However, the energization of the coil 98 and the consequent movement of the contactors 107, 108 and 109 which are carried by the panel 101, interrupts the circuits of both the coil 98 and the coil 93 of the delay device and as the circuit of the coil 97 is never broken, the switch device will be maintained in its normal position, (the magnetism of the coil 97 being great enough to hold the same thus) until the next voltage dip occurs on the main line.

From the foregoing description taken in connection with the accompanying drawings it will be readily apparent to those skilled in the art to which an invention of this character appertains that I have provided an efficient and reliable means whereby the opening of a motor circuit due to voltage dips on the main line is prevented.

What I claim as my invention is:

1. The combination with a source of electrical energy and a voltage responsive device normally energized therefrom, of means responsive to a drop in E. M. F. of said source for impressing an E. M. F. of higher value than that of said source on said device to prevent its release, means for reconnecting said device with the source of electrical energy, and means for delaying the functioning of said reconnecting means for a predetermined time interval after the occurrence of said drop in E M. F.

2. The combination with a source of electrical energy and a voltage responsive device normally energized therefrom, of means responsive to a dip in E. M. F. of said source for impressing an E. M. F. of higher value than that of said source on said device to prevent its deenergization and comprising a switch electromagnetically held in one position, said switch being moved to a second position upon the occurrence of a dip in E. M. F., means whereby the switch in its second position causes the E. M. F. of said higher value to be impressed upon the said device, means for moving the switch to its original position to reconnect the device with the source of electrical energy, and means for delaying the functioning of said last mentioned means for a predetermined time interval after the movement of the switch to said other position.

3. The combination with a source of electrical energy which is subject to dips in voltage and an electroresponsive device adapted to be normally energized from said source, of means for preventing the release of the electroresponsive device during such voltage dips and comprising, a magnetically held switch which releases upon the occurrence of a voltage dip, means whereby the release of said switch impresses an E. M. F. of higher value than that of the source of electrical energy on the electroresponsive device, and means operable after a predetermined time interval to cause said magnetically operated switch to be moved to its original position to reconnect the electroresponsive device with the source of electrical energy.

4. The combination with a source of electrical energy which is subject to dips in voltage and an electroresponsive device adapted to be normally energized from said source, of means for preventing the release of the electroreponsive device during such voltage dips and comprising, a magnetically operated switch which releases upon the occurrence of a voltage dip, means whereby the release of said switch impresses an E. M. F. of higher value than that of the source of electrical energy on the electroresponsive device, means operable to assist in moving the switch to its original position to reconnect the electroresponsive device with the source of electrical energy, and means for causing said last mentioned means to function after a predetermined time interval.

5. The combination with a source of electrical energy which is subject to dips in voltage and an electroresponsive device adapted to be normally energized from said source of means for preventing the release of the electroresponsive device during such voltage dips and comprising, a switch having two positions one of which connects the electroresponsive device with said source of electrical energy and the other impresses E. M. F. of higher value than that of the source of electrical energy on the electroresponsive device, an electromagnet energized from the source of electrical energy and normally holding the switch in its position connecting the electroresponsive device therewith, means for moving the switch to its other position upon a dip in voltage of said source, a second normally deenergized magnet for assisting the first electromagnet in returning the switch to its original position after the occurrence of a voltage dip, and means whereby said second electromagnet is energized after a predetermined time interval after the occurrence of said voltage dip.

6. The combination with a source of electrical energy which is subject to dips in voltage and an electroresponsive device adapted to be normally energized from said source, of means for preventing the release of the electroresponsive device during such voltage dips and comprising, a switch having two positions one of which connects the electroresponsive device with the source of electrical energy and the other impresses an E. M. F. of higher value than that of the source of electrical energy on the electroresponsive device, an electromagnet energized from said source of electrical energy holding the switch in said first position, means for moving the switch to its other position upon a dip in voltage of said source, a second electromagnet adapted to be energized by said E. M. F. of higher value, means whereby the second electromagnet upon energization assists the first magnet in returning the switch to its original position, and means operable to close the circuit of the second magnet after a predetermined time interval whereby the two electromagnets together move the switch to its original position.

7. The combination with a source of electrical energy which is subject to dips in voltage and an electroresponsive device adapted to be normally energized from said source, of means for preventing the release of the electroresponsive device during such voltage dips and comprising, an electromagnetically operated switch normally held in one position by an electromagnet energized from said source of electrical energy and movable upon a dip in voltage of said source to a second position to impress an E. M. F. of higher value than that of said source on the electroresponsive device, a second electromagnet which when energized assists the first to move the switch to its original position, and a time relay operable after a predetermined period to close the circuit of the second electromagnet, the circuit of the time relay being closed by movement of the switch to its second position upon a dip in voltage and being opened by movement of the switch to its original position whereby the second mentioned electromagnet becomes deenergized as the switch returns to its original position.

8. The combination with a source of electrical energy which is subject to dips in voltage and an electroresponsive device adapted to be normally energized from said source, of an apparatus for impressing an E. M. F. of higher value than that of said source on the electroresponsive device upon a voltage dip to prevent deenergization of said electroresponsive device and comprising, a magnetically operated switch normally held in one position by one electromagnet which upon the occurrence of a oltage dip permits the switch the move to another position, a second electromagnet operable to assist the first in restoring the switch to its original position, and means for energizing the second electromagnet at a predetermined time after the occurrence of a voltage dip.

9. The combination with a source of electrical energy which is subject to dips in voltage and an electroresponsive device adapted to be normally energized from said source, of an apparatus for impressing an E. M. F. of higher value than that of the source on the electroresponsive device upon the occurrence of a voltage dip to prevent deenergization of said electroresponsive device and comprising, a magnetically actuated switch normally held in one position by one electromagnet which upon such voltage dips permits the switch to move to another position, a second electromagnet operable to assist the first in restoring the switch to its original position, means operable to close the circuit of the second electromagnet at a predetermined time after movement of the switch to said other position, and means whereby said second electromagnet becomes deenergized when the switch resumes its original position.

In testimony whereof I hereunto affix my signature.

GUSTAV O. WILMS.